United States Patent Office 3,479,454
Patented Nov. 18, 1969

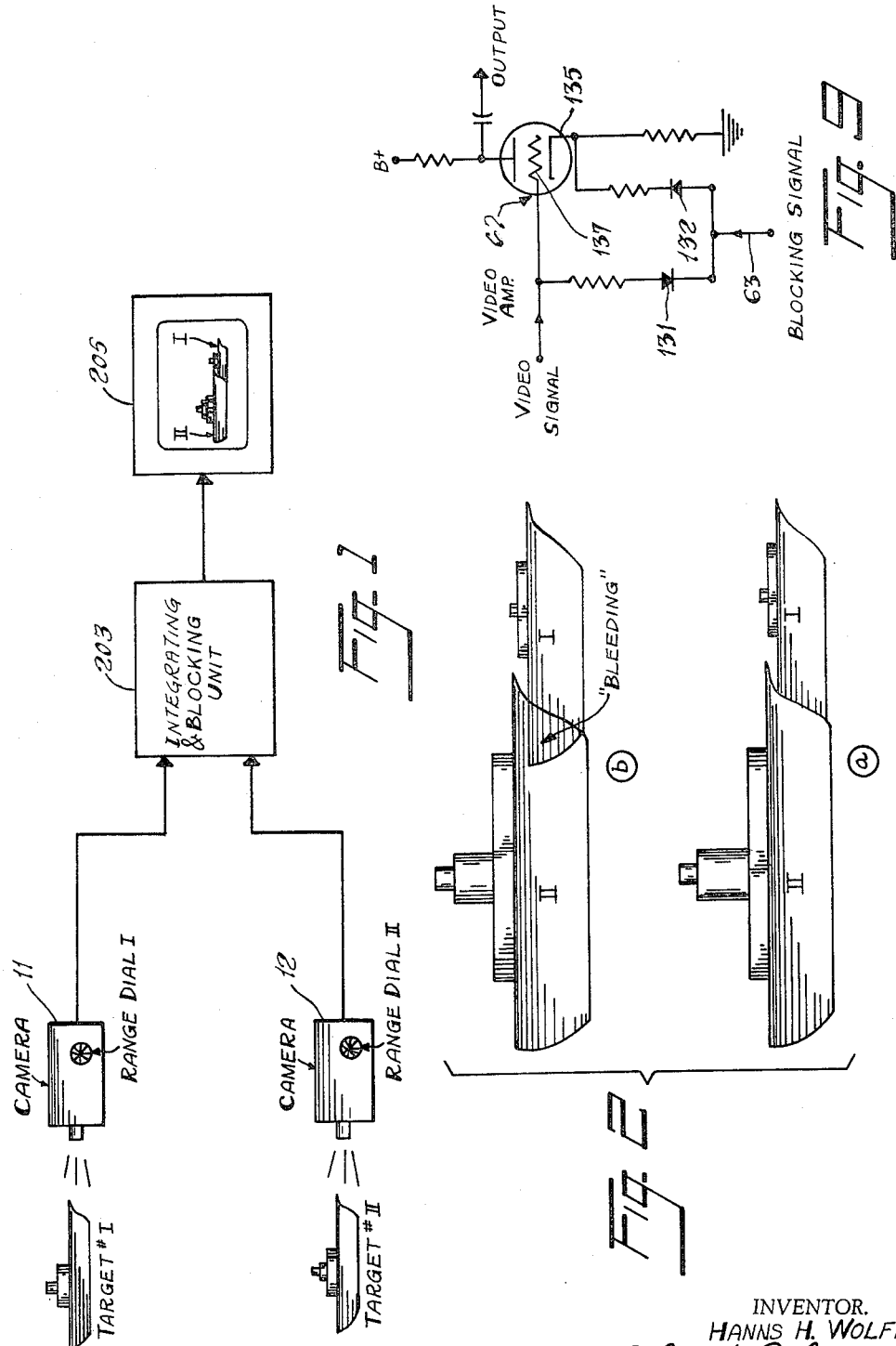

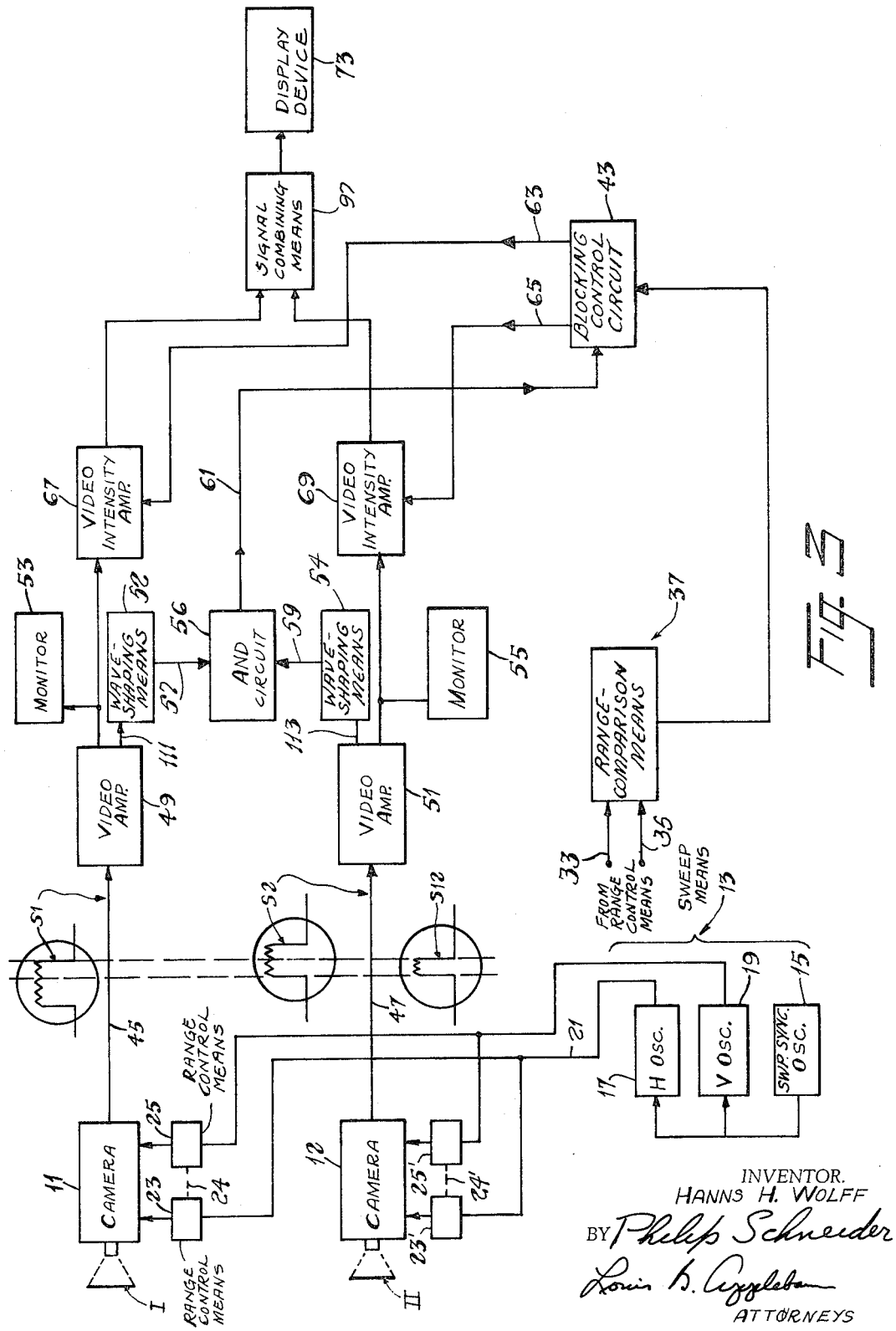

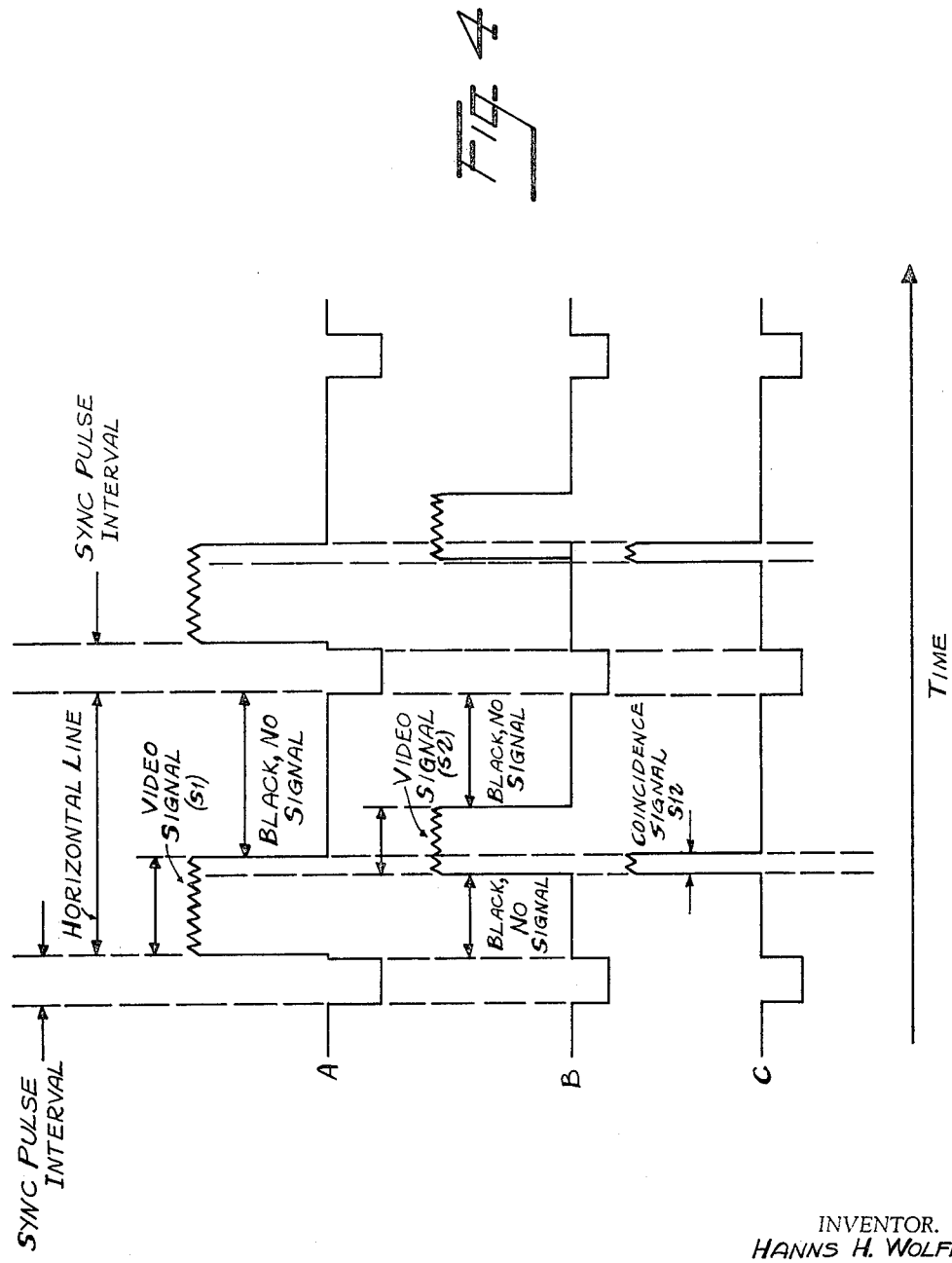

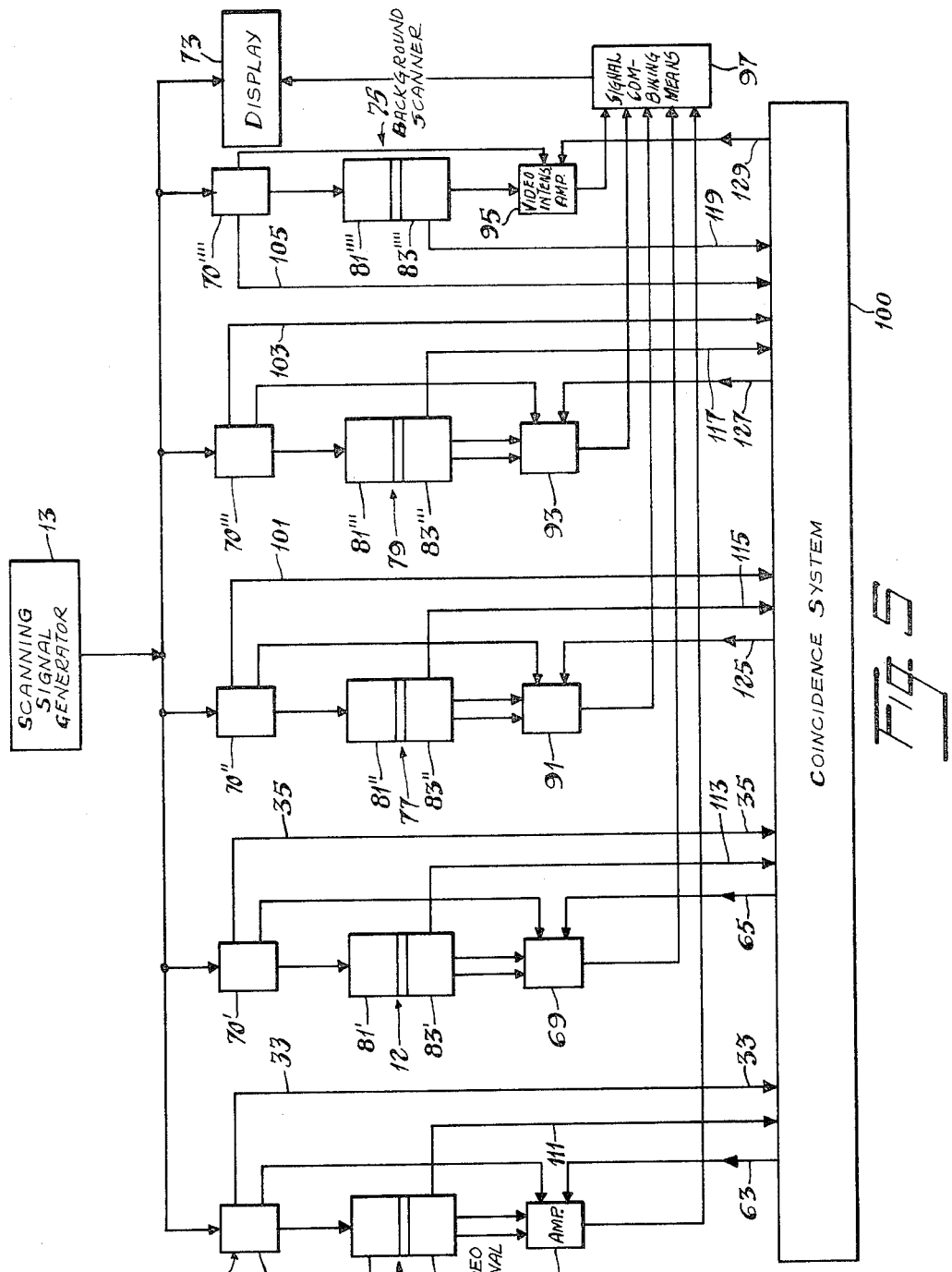

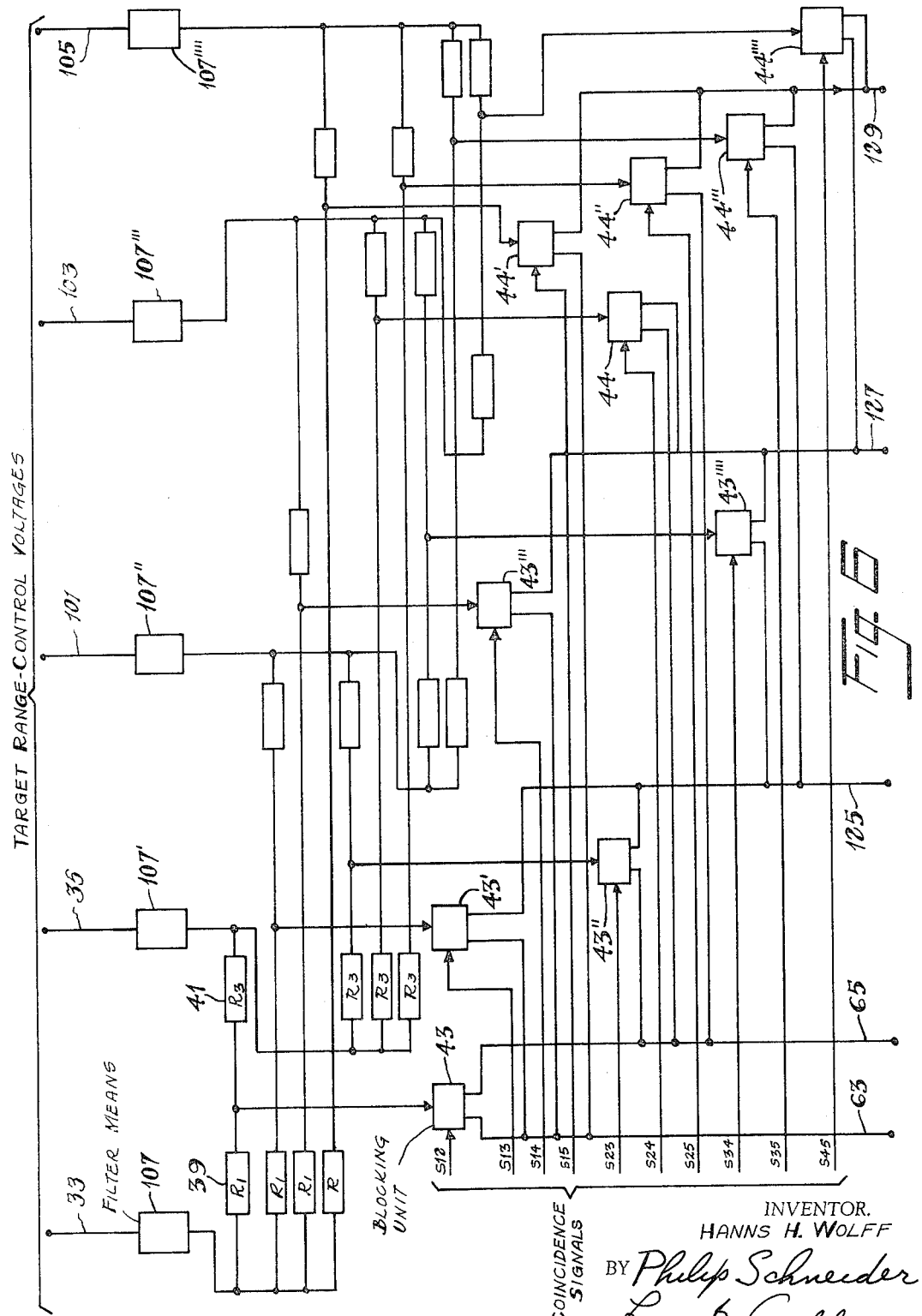

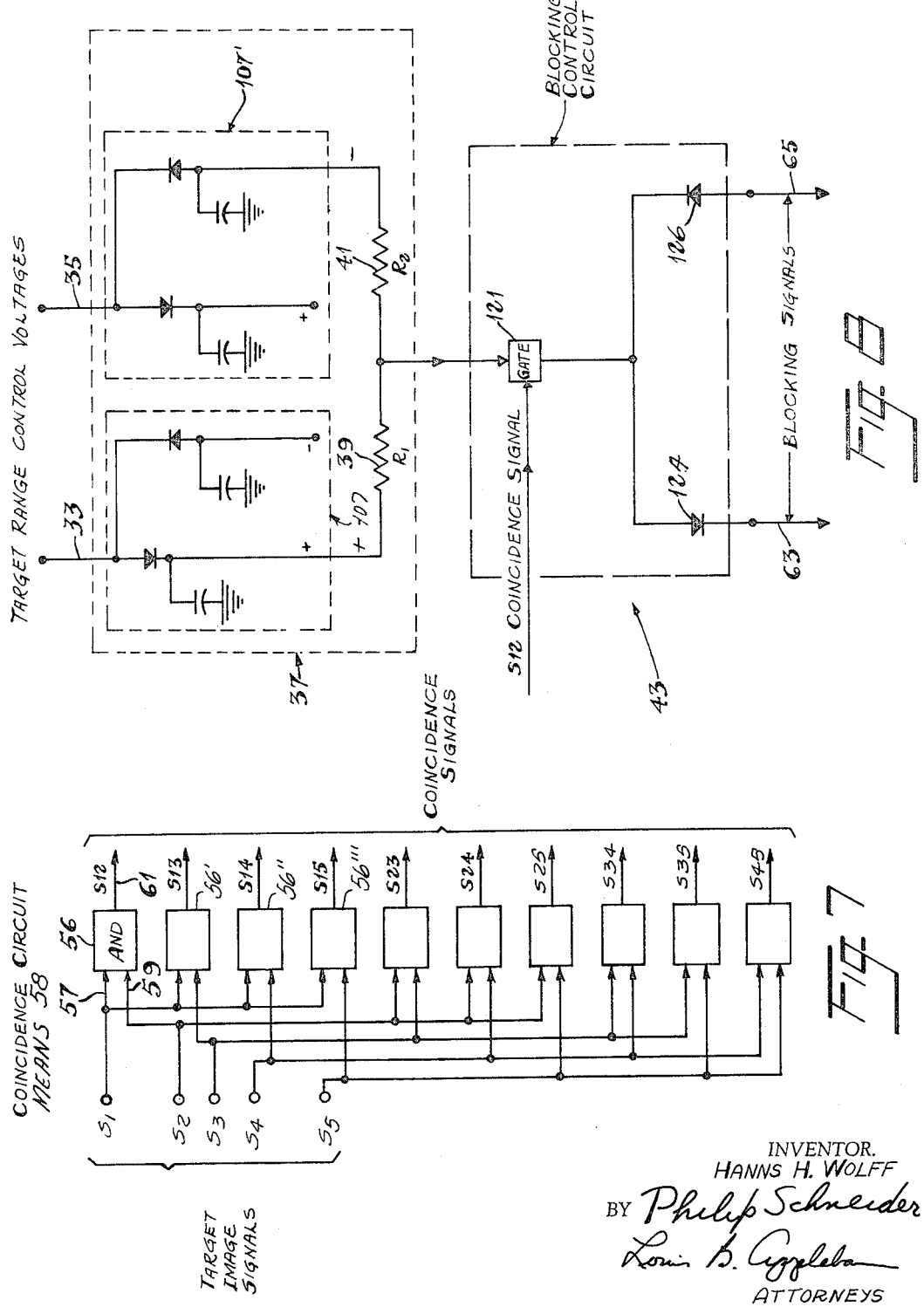

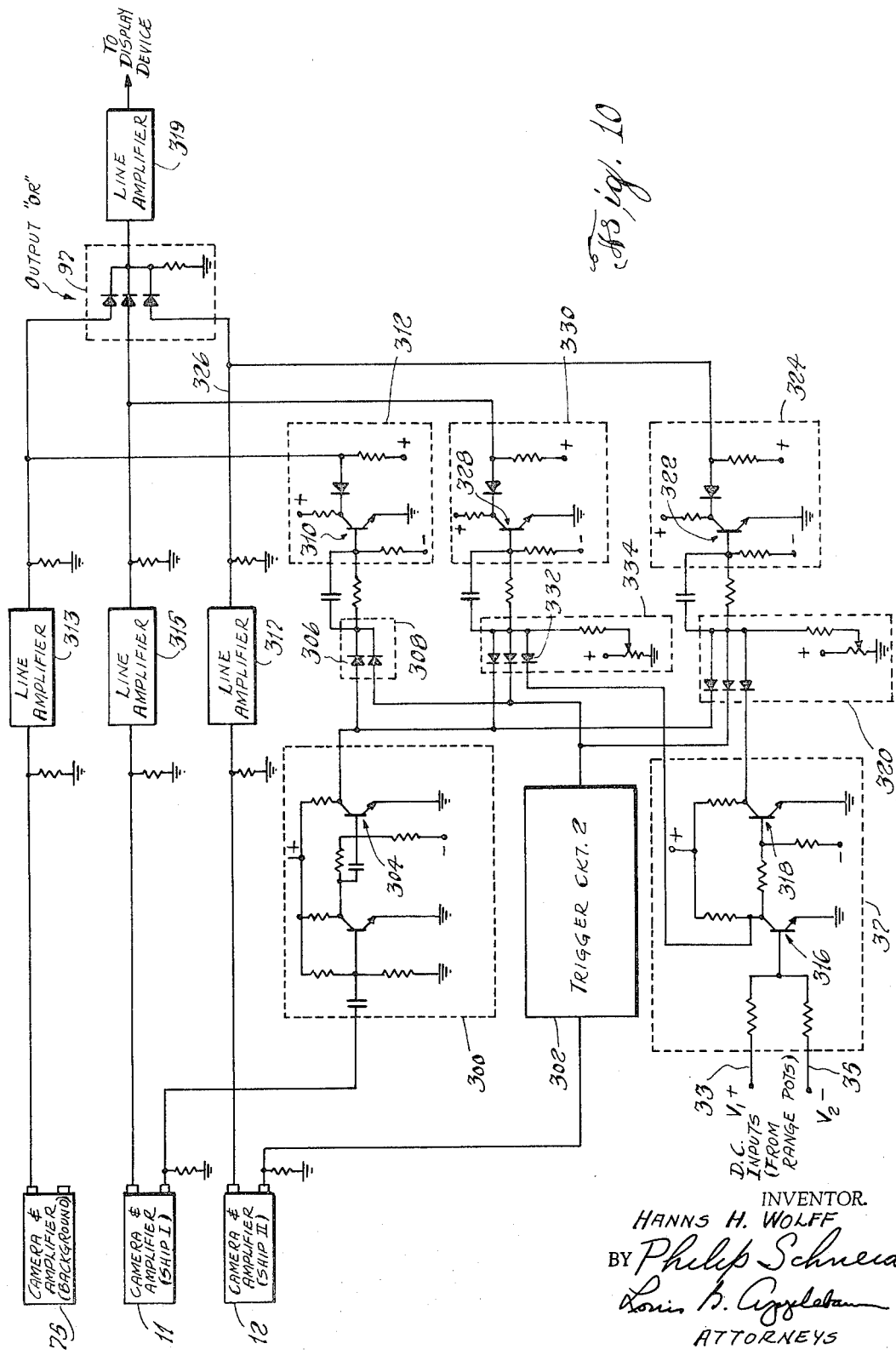

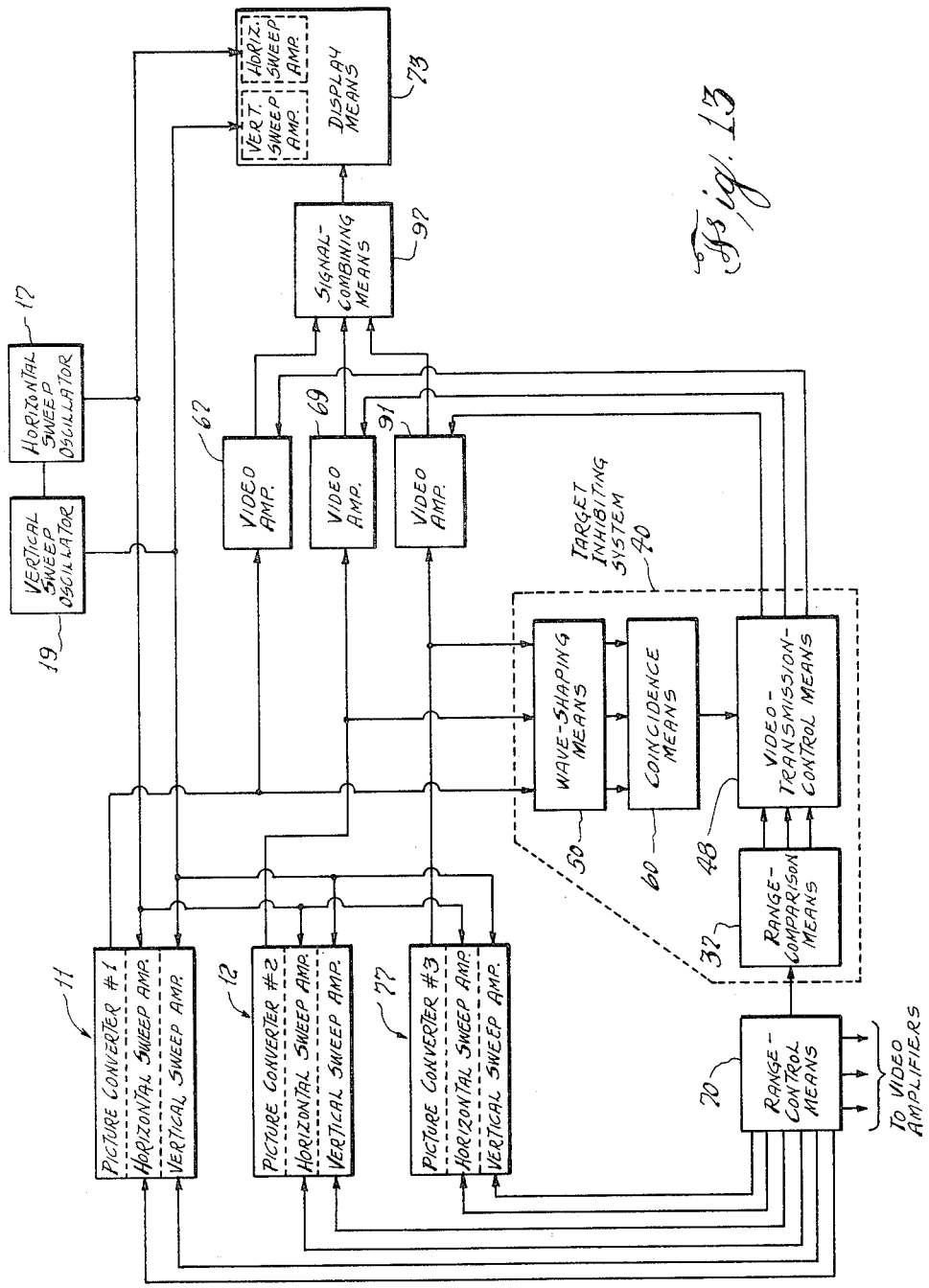

3,479,454
ELECTRONIC SYNTHESIZER
Hanns H. Wolff, Huntington, N.Y., assignor to the United States of America as represented by the Secretary of the Navy
Continuation-in-part of application Ser. No. 526,322, Feb. 8, 1966. This application Mar. 14, 1966, Ser. No. 535,659
Int. Cl. H04n 5/38
U.S. Cl. 178—6.8                                7 Claims

ABSTRACT OF THE DISCLOSURE

An apparatus for synthesizing the electrical signals separately derived from a plurality of targets, including a range-control means for producing signals indicative of the range of the targets, said range-control signals being used to block the video signals of those targets which are behind any other targets.

---

This application is a continuation-in-part of application Ser. No. 526,322, filed Feb. 8, 1966, now abandoned.

This invention relates to the simulation of visual environments, and more particularly pertains to the simulation by electronic synthesis of a landscape or seascape that includes a plurality of movable objects, each of whose motions is controlled independently in the visual environment.

Visual displays are very helpful in presenting a simulated "real world" view to a student in a training situation. An example of such a situation is the view seen by a student from a flight simulator cockpit during landing or other maneuvers. Other examples include a docking officer's view of a harbor or wharf while berthing a vessel, or the view seen through a submarine periscope.

To be most effective as a training aid, a visual display for operator-controlled simulators should be non-programmed; that is, the display should respond in real time to the trainee's and/or the instructor's inputs. The present invention utilizes a television-generated display provided with more than one input signal to present a visual display as it would appear in real time. If several separate objects, for example aircrafts or ships, were to be presented to a trainee for a particular training situation, those objects closest to the observer would appear larger than those further away, due consideration being given to relative size of each, and would also appear to become larger or smaller in size as the viewing distance decreased or increased. Also, an object passing in front of another relative to the line of sight of the observer would block the observer's view of the distal object.

Different techniques have been employed to attempt to realistically simulate a plurality of separate objects which can be moved independently of one another, but which are displayed by common display means. For example, models and cameras have been used as the signal source in a scale model of a training scene, and the relative positions with respect to the camera of objects in such a scene will naturally and automatically provide a proper view to the observer. However, this method has certain disadvantages, particularly where relatively large sizes of models are required and in situations where larger distances may be involved.

Combining the images of any number of separate picture sources have also been utilized. The two ways of doing this, however, have disadvantages also: where either the separate objects would "bleed" through each other, or where specialized electronic insertion equipment is used, there would result problems of object contrast restriction, obviousness of inserted images, restricted response, and most important, extreme complexity of electronic equipment. The present invention basically utilizes a plurality of separate, independently controllable optical images of various ranges, each optical image being converted into video signals by a plurality of video means, one video means being provided for each of said optical images. A blocking unit is connected to each of the video means for blocking the transmission of those video signals from an optical image or optical images which are coincident in time with another video signal from an optical image which has a smaller range. The circuitry permits a change in an object's size in accordance with the desired simulated range of distance from an observer. Hence, distant objects appear smaller than nearby objects on a visual display, and objects change in size in accordance with changes in the simulated distance.

Accordingly, one of the prime objects of the present invention is to provide a means for more realistically simulating a visual environment wherein a plurality of separate independently movable objects are utilized.

Another object of the present invention is to provide a television display which is composed of several separate signal sources combined together to form one picture.

Still another object of the present invention is to provide a realistic visual display of the real world to a student in a training situation.

An additional object of the present invention is to provide apparatus for generating video signals, said apparatus utilizing extremely small models to simulate a desired scene.

Another object of the present invention is to provide an improved simulation means which realistically simulates both nearby and distant movable objects.

A still further object of the present invention is to provide means which can combine the images of a number of separate picture sources, or object sources, without "bleeding" of images which lie on a line of sight of an observer.

Still another object of the present invention is to provide an apparatus for generating video signals in response to a plurality of optical images of various ranges which overcome the problems of obviousness of inserted images and object contrast.

Another object of the present invention is to provide a very simple apparatus for generating video signals in response to a plurality of separate optical images of various ranges.

Other objects and many of the attendant advantages of this invention will be readily appreciated as the same becomes better understood by reference to the following detailed description when considered in connection with the accompanying drawings wherein:

FIG. 1 is a flow diagram of apparatus embodying the invention;

FIG. 2a illustrates the display which the present invention provides when the simulated range of one target object (II) is smaller than the simulated range of a second target object (I);

Figure 11:
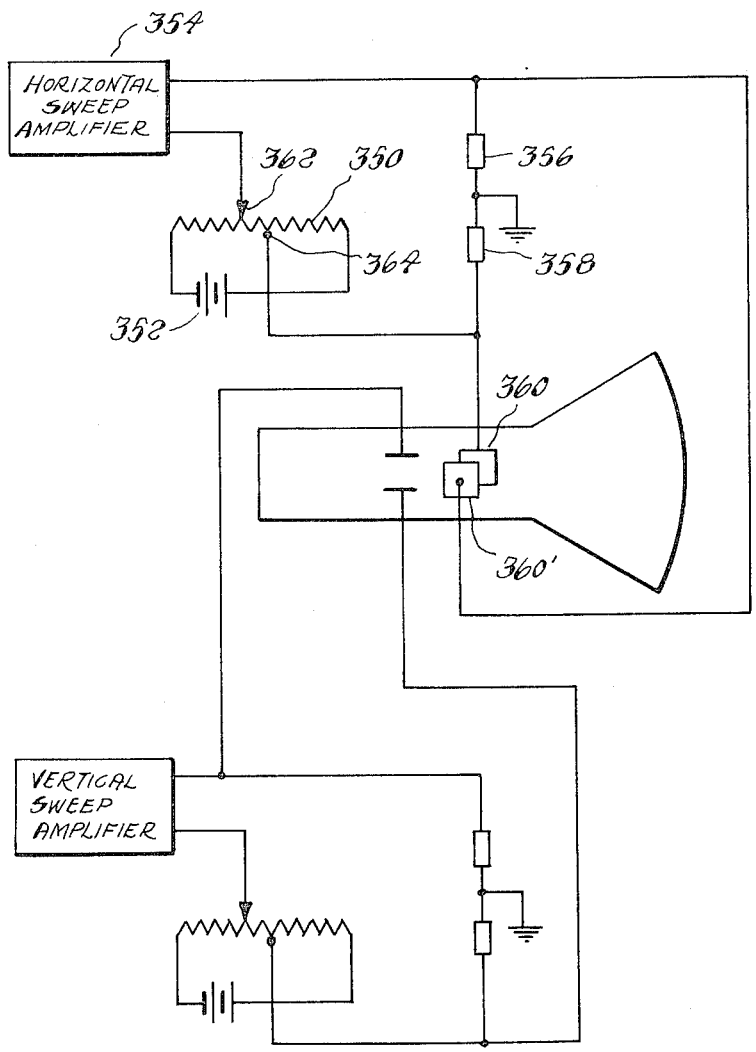
Figure 12A:
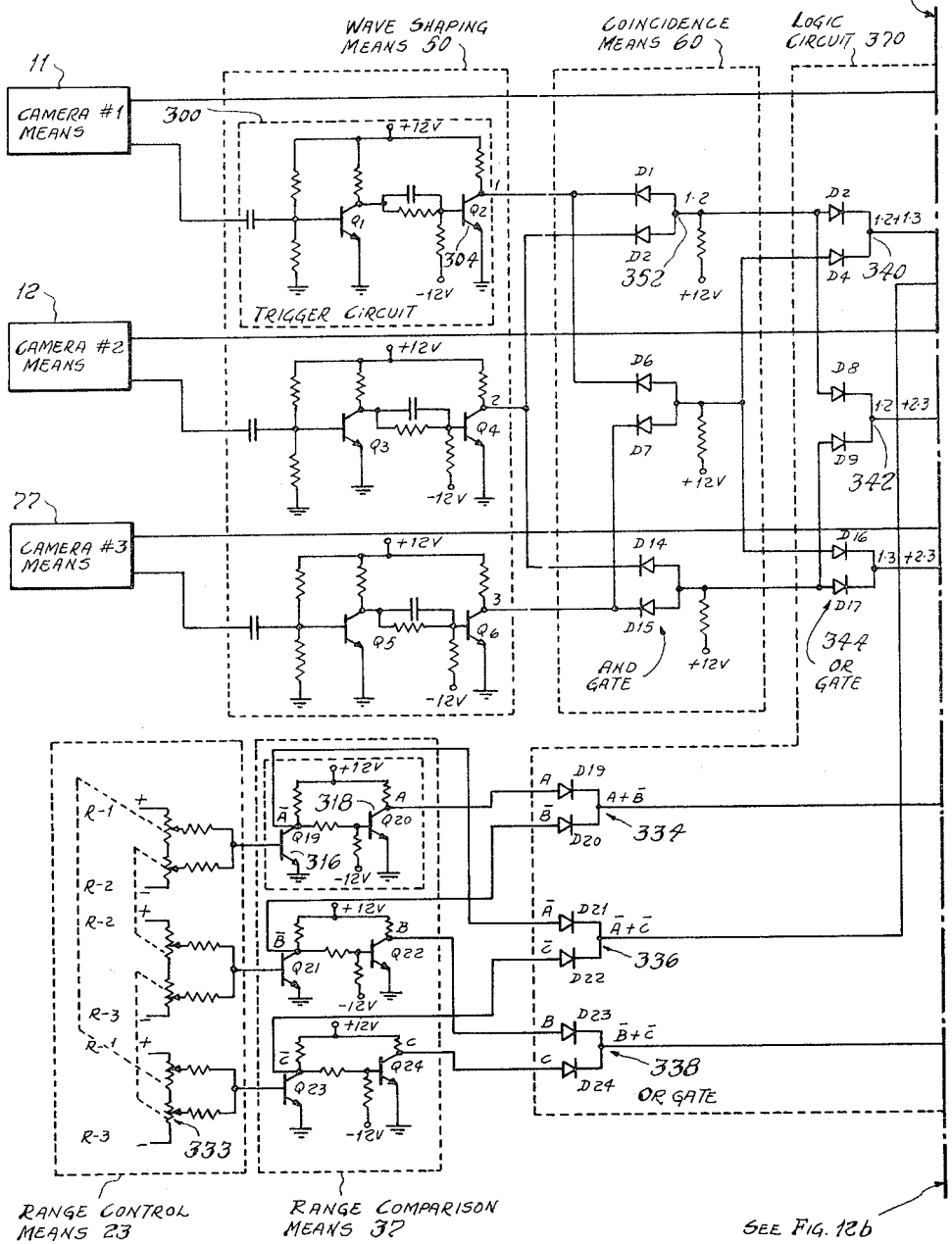
Figure 12B:
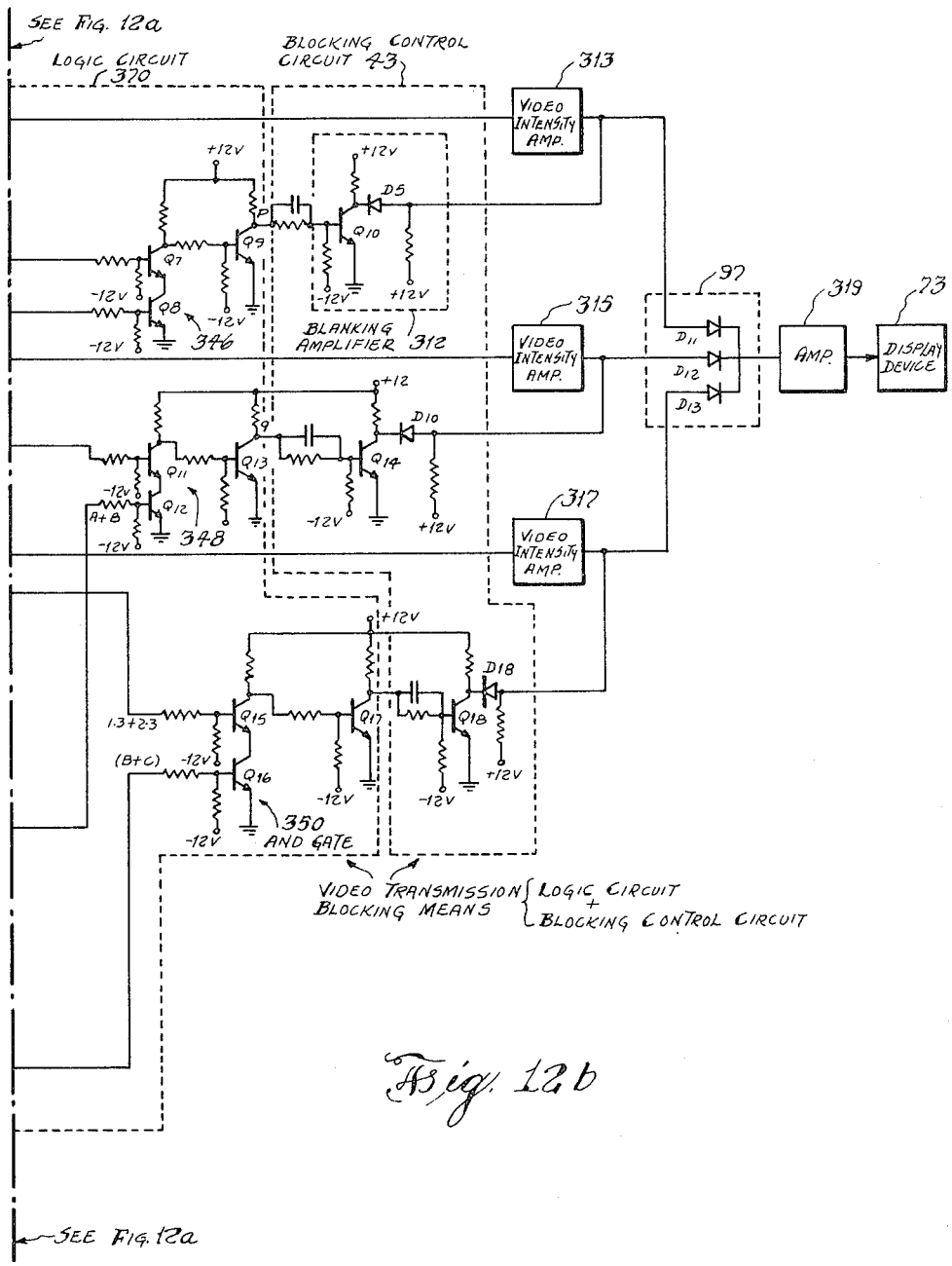

FIG. 2b illustratse the display which prior art devices provide for the same conditions and the failure of prior art devices to prevent "bleeding" of the target images when they overlap;

FIG. 3 is a functional block diagram of an embodiment of the present invention which utilizes two separate targets;

FIG. 4 illustrates various wave forms that show the mode of operation of the circuit disclosed in FIG. 3;

FIG. 5 is a simplified functional block diagram of another embodiment of the present invention which provides a visual display of four separate targets;

FIG. 6 is a detailed functional block diagram of part of the coincidence system of the circuit disclosed in FIG. 5;

FIG. 7 is a functional block diagram of another part of the coincidence system of the circuit disclosed in FIG. 5;

FIG. 8 is a partly functional block diagram and partly schematic diagram of the details of one embodiment of the control blocking circuit elements 43 and 44 of the circuit disclosed in FIG. 6;

FIG. 9 is a detailed schematic of an embodiment of part of the circuitry coupling a blocking signal from the circuit disclosed in FIG. 8 to the video intensity amplifier of the circuit disclosed in FIG. 5;

FIG. 10 is in part a block diagram and in part a schematic diagram showing a second embodiment of the invention;

FIG. 11 is a schematic circuit diagram illustrating one means of adding a DC bias voltage to the sweep voltages in an electrostatic deflection system for a cathode ray tube;

FIGS. 12a and 12b together form a schematic circuit diagram of a preferred embodiment of the invention; and FIG. 13 is a block diagram showing the overall concept of the invention.

Similar numerals refer to similar parts throughout the several views.

Referring to FIG. 1, two separate, independently movable targets, I and II and two cameras 11 and 12, one for each of the particular targets, are indicated. The cameras may, for example, be vidicon or image orthicon tubes, or flying spot scanners. The image of the scene viewed by each camera develops at each instant a voltage proportional to the light intensity of the portion of the particular scene being scanned.

The resultant video signals are coupled from each of the cameras 11 and 12 to a signal integrating and blocking unit 203, which will be described in detail. The integrating and blocking unit 203 generally operates to combine the camera outputs, but when video signals from two target objects are coincident in time, it operates to block the transmisison of video signals from that one of the target objects which has the greater range. The resultant output signal from the blocking unit 203 is then coupled to a conventional television receiver 205 which displays the combined signal as illustrated. The range dials on each of the cameras, as will be described in detail, are utilized to vary the apparent range of the target images I and II. The cameras 11 and 12 and the display device 205 are conventional and are described in detail in Frederick E. Terman's "Electronic and Radio Engineering," published by McGraw-Hill, New York City, fourth edition, chapter 25, pages 977–1013.

Referring to FIG. 2a, there is illustrated a visual display which would be shown on display means 205 of the circuit disclosed in FIG. 1; and in FIG. 2b, the display of the same scene that would be presented by a prior art device which did not eliminate the effect of "bleeding." The bleeding effect, as shown in FIG. 2b, results when two separate video signals which are coincident in time are combined and one of said signals is not blocked out of the overlapping portion so that both signals are discernible therein.

Referring to FIGS. 3 and 4, there is illustrated a functional block diagram of one embodiment of the present invention which utilizes two separate target objects I and II. Each of the target objects is picked up by a camera means, 11 or 12, thereby providing at the output of camera 11, for example, a signal referred to as "S1" which is in response to target object I. Similarly, camera 12 picks up the second target object II, and provides a second video signal, referred to in the drawing as "S2." An examination of "S2" indicates that, for this particular case, a portion of the second target object II is not at the same place as the first target object I, but is actually to one side of the first object. However, both targets have portions within the line of sight of an observer, as illustrated by "S12," the coincidence signal, which will be described in detail below. Coupled to the cameras I and II are conventional sweep means 13 which includes a synchronizing source of oscillation called the sweep 15 synchronizing oscillator 15 providing an output having a frequency appropriate for use in television, the oscillator having its output coupled to horizontal and vertical oscillators 17 and 19 which provide the horizontal and vertical sweep voltages necessary for the proper scanning operation of the cameras 11 and 12, respectively. The horizontal sweep oscillator 17 is coupled by line 21 to a range control means 23 associated with camera 11 and a similar control means 23' associated with camera 12. In a similar manner, the output of vertical sweep oscillator 19 is coupled to a similar range control means 25 associated with camera 11 and control means 25' associated with camera 12. These range control means 23, 25, 23' and 25' are utilized to vary the amplitude of the sweep voltages coupled into their respective cameras in a conventional manner and to provide one or more output voltages which are a function of range and are called "range-controlled voltages." Control of the horizontal and vertical sweep amplitude of a single camera is preferably performed by a single device. Thus, for example, the range control means 23 and 25 may comprise a plurality of variable potentiometers all ganged to the same shaft 24, with provisions to tap off voltages for the camera sweep circuits and for other uses, as desired. Some of the potentiometers may also be provided with input voltages which are not derived from the sweep oscillators; for example, the input to some of the potentiometers may be DC voltages.

The particular amplitudes of the sweep voltages at the output of these control means 23 and 25, and 23' and 25', are varied by the range control means so as to provide a variation in the apparent range of the target objects I and II. For example, a reduction in the amplitude of the scanning sweep voltage coupled to a camera by setting the appropriate range control means to a lesser range causes the image to appear larger in the display unit 73 since the amplitude of the sweep voltages which control the raster size of the display unit 73 are not varied. Thus the apparent range of an object automatically becomes a function of the values of the scanning sweeps of the camera which views the object.

Apparent azimuthal and vertical motion of a target can be accomplished by mechanical or electrical means. For example, either the camera or the target can be moved up or down (or sideways) to impart apparent vertical (or horizontal) movement to the target. For changes in attitude, the target can be rotated around a fixed axis. These movements can be effected manually or by conventional servomotor drive and gearing arrangements, for example.

If the display 73 comprises a cathode ray tube with an electrostatic deflection system, an adjustable DC bias may be added to each sweep voltage so that the mid-point of the sweep voltage can be varied. This permits the mid-point to be moved vertically and horizontally. One means of accomplishing this is shown in FIG. 11. The DC bias is supplied by means of a center-tapped potentiometer 350 and battery 352 arrangement which places a DC voltage in series with the sweep voltage to the horizontal deflection plates 360, 360'. The DC voltage can be made positive or negative in polarity by varying the position of the movable tap 362 of the potentiometer to one side or the other of the center tap 364. A pair of resistors 356 and 358, which are center-tapped to ground, are placed across the deflection plates 360, 360' and the sweep voltage is connected across these resistors. A similar arrangement is used for the vertical deflection circuit.

As will be readily apparent to those familiar with the electronic art, vertical and horizontal target movement can be effected in magnetic deflection tubes by adjusting the biasing current which flows through the vertical and horizontal deflection coils.

A plurality of target range-controlled voltages, each having an amplitude which is proportional to the apparent range desired of the particular target with which it is associated, are coupled from the range control means over lines 33 and 35 to a range-comparison unit means 37 described below in detail. The output of the range-comparison means is a DC signal of either negative or positive polarity, and the output is in turn coupled to a blocking control circuit 43 described in detail below. The outputs of each of the cameras 11 and 12 are coupled respectively over lines 45 and 47 to video signal amplifiers 49 and 51. The amplified outputs are coupled to video intensity amplifiers 67 and 69, respectively for amplification. They are also coupled over lines 111 and 113 to wave shaped means 52 and 54 which are simply conventional circuits which develop a pulse of fixed amplitude whenever video signal is present and superimpose the video variations on the pulse. The shaped video signals are then coupled over lines 57 and 59, respectively, to a coincidence, or "AND," circuit 56. The output of the "AND" circuit 56 is a coincidence signal which exists only when the target video signals are coincident in time and this coincidence signal is fed to a blocking control circuit 43 which operates to produce a signal and couple it to that video intensity amplifier which is associated with the target which has the greater range. This signal then blocks the amplifier so that the target signal is not transmitted during the coincidence interval. The video intensity amplifier outputs are fed to a signal-combining means 97, which may merely be some type of resistive adding network, for example, where the separate signals are integrated into a combined signal which is then coupled to a display device 73, usually of a visual type. The unshaped output from these video signal samplifiers 49 and 51 may also be coupled to monitors 53 and 55, each of which displays only the target object viewed by its respective camera 11 or 12.

FIG. 4 illustrates by means of waveforms the operation of the "AND" circuit 56, wherein a plurality of video signals, S1 and S2, are applied to the "AND" circuit 56 over lines 57 and 59. As illustrated by waveform C, a coincidence signal S12 is generated when two video signals are simultaneously applied at the inputs of the "AND" circuit 56. This coincidence signal S12 is then coupled over line 61 to an input of a blocking control circuit 43 referred to a detail infra. As described previously, the conversion unit 37 provides a D.C. output voltage which is coupled to the blocking control circuit 43, the polarity of the voltage being indicative of which of the two target objects I and II has the greatest apparent range. Depending on the particular input signal polarity coupled to the blocking control circuit 43 and the simultaneous occurrence of the coincidence signal S12, there will be provided a blocking signal generated by said blocking control circuit 43 over either of the two blocking lines 63 and 65. These blocking signals coupled over lines 63 and 65 control video intensity amplifiers 67 and 69, respectively. If there is a coincidence signal S12 present, and target object I is closer or has a smaller apparent range than target object II, there will be a blocking signal coupled over blocking line 65 to intensity amplifier 69 to block the video signal present at its input and thereby prevent video signal S2 of camera 12 from passing therethrough for the duration of the coincidence signal S12. Similarly, if the apparent range of target object II is smaller than the apparent range of target object I, and there is present a coincidence signal S12 coupled to blocking control circuit 43, there will result a blocking signal coupled over blocking line 63 which will cut off video intensity amplifier 67, and thereby block any video signal S1 from passing therethrough to signal-combining means 97, and finally to the display device 73. Thus, when signals occur from the two target objects I and II, at precisely the same time, that is, when both signal information bits for each line scan occur at the same instant, the output of the "AND" circuit 56 provides a coincidence signal S12 which, in turn, is applied to the blocking control circuit 43 which cuts off one of the video signals S1 or S2, whichever represents the target which has the greater apparent range. When only one video signal or no video signal exists, no blocking signal voltage is produced and both video intensity amplifiers 67 and 69 conduct as usual.

Referring to FIG. 5, there is illustrated in simplified functional block diagram form an embodiment of the invention which can reproduce four targets and a background scene. A scanning-signal generator, or sweep means 13, is coupled to a plurality of range control units 70, 70', 70'' and 70''', (similar to the group of elements including 23, 25 in FIG. 3 as well as to a display unit 73.) These range control units 70, 70', etc., are utilized to set the various apparent ranges for each of the individual target objects (not shown). If the background scene does not vary in range, range voltage provided by range control means 70'''' is a voltage of fixed value. Each of the other control units 70, 70' etc., varies the amplitude of the scanning voltage output from scanning-signal generator unit 13 and couples it to its respective camera units 11, 12, 77 and 79. The variable range control units 70, 70' etc. can be manually adjusted so that the individually scanned pictures or targets appear at a controllable apparent range, a target being scanned by a smaller or larger number of scanning lines depending upon the desired apparent range. The smaller the number of scanning lines, the further away the target appears to be, so that effective apparent range control is provided. The resulting images from the independent target objects associated with each of the individual cameras 11, 12, 77 and 79 are scanned at the image sections 81, 81', 81'', 81''' and 81'''', of the cameras by their scanning units 83, 83', 83'', 83''' and 83'''' in a conventional manner thereby providing output video signals, which are in turn coupled to their respective video intensity amplifiers 67, 69, 91, 93 and 95. The outputs of these intensity amplifiers are then coupled to a signal-combining unit 87 which may be an "OR" circuit or a resistive adding network and which controls the intensity of the display unit 73, thereby providing at said display 73 a combined picture of the four target objects and the video signal from the background scanning unit 75. Additionally, each of the range control units 70, 70', etc., provide range-control signals which are indicative of the apparent range at which the respective target objects appear and which are coupled to coincidence system 100 (discussed in detail infra) over lines 33, 35, 101 and 103. This coincidence system 100 compares the target range control voltages coupled over said lines, and controls the intensity amplifiers 67, 69, 91, 93, and 95 so that only the signal from the nearest target (when there is more than one video signal present is transmitted). If no target is scanned at a certain moment, the signal from the background scanning unit 75 is applied to the signal-combining unit 97 which controls the intensity of the display 73. If it is desired to compensate for picture intensity changes resulting from changes in camera raster size as the sweep voltages change in response to the operation of the range control units 70, 70', etc., intensity compensation can be accomplished by providing a signal from each of the range control units, 70, 70', etc., to control the gain of the video intensity amplifiers 67, 69, 91 and 93, respectively.

Rather than using an ordinary photoelectric image section in the cameras for different three-dimensional target models, it may be desirable to use transparencies and flying spot scanners for the background. A further modification may be made to the embodiments by coupling the control of the scanning spot size with the range control units, 70, 70', etc., to avoid a reduction in picture definition.

Referring now to FIG. 6, which is a detailed functional block diagram of part of the coincidence system, viz block 100 of FIG. 5, there is provided a plurality of target range-control voltages, five in this particular embodiment, which are applied over lines 33, 35, 101, 103 and 105, respectively, and a plurality of coincidence signals referred to as S12, S13, S14, S15, S23, S24, S35, and S45 which are derived from the coincidence circuits as described infra in FIG. 7. Each of the coincidence signals is coupled to one input of one of a plurality of control blocking circuits, 43, 43′, 43″, 43‴, 43⁗, 44, 44′, 44″, 44‴ and 44⁗, respectively. Each of these control blocking circuits 43, 44, etc., provides a blocking signal upon the occurrence of a coincidence signal S12, S13, etc.

FIG. 7 illustrates the organization of coincidence circuits necessary to provide, in a conventional manner, the various coincidence signals S12, S13, S14, etc., said coincidence circuits comprising a plurality of "AND" circuits 56, 56′, 56″, etc. Ten "AND" circuits are necessary to provide for all the combinations of two input signals that can occur from a total of five different input signals.

These coincidence signals, as described above with reference to FIGS. 3 and 4, are present whenever at least one of the target video signals is simultaneously present with another one of the target video signals. Referring back to FIG. 6, each of the target range-control voltages is either directly compared to another target's range-control voltage or compared after said target range-control voltage has been inverted in polarity by one of the filter networks 107, 107′, 107″, 107‴ and 107⁗, as explained in detail below with reference to FIG. 8.

FIG. 8 shows exemplary circuits which may be employed in the conversion unit 37 and the blocking circuit 43 shown in block form in FIG. 3. Target range control voltages, which are proportional in amplitude to the apparent range of their respective target objects, are coupled over lines 33 and 35 to the conversion unit 37. Assuming that said target range-control voltages are sinusoidal AG voltages, (although they may be DC voltages, in which case only a simple DC voltage comparison circuit would be needed), said AC voltages are converted to DC voltages. Thus, the voltage from target object I, which comes to the range-comparison means 37 on line 31, is converted to a proportional DC voltage of positive polarity, and the voltage from target object II, which is coupled over line 35, is converted by diode filter means 107′ to a proportional DC voltage of negative polarity and said DC voltages are summed by bridge resistors 39 (R1) and 41 (R2). If the output of the conversion unit 37 is positive, it indicates that the apparent range of the first target object I is greater than the apparent range of the second target object II. If the output of the range-comparison means 37 is negative, this represents a situation where the apparent range of the first target object I is smaller than the apparent range of the second target object II. The signal from the output of the range-comparison means is then coupled to an input of a conventional gate circuit means 121 which is a component of the blocking-control means 43 and which is controlled (gated, or opened) by a coincidence signal S12. A DC voltage of positive or negative polarity is therefore coupled through this gate circuit 121 upon the occurrence of the coincidence signal S12.

This gated DC signal is coupled to a control line 63 or 65, depending on its polarity. If the gated voltage is positive, a blocking signal is coupled over control line 63 and if it is negative, a blocking signal is coupled over control-line 65, the particular path taken being due to the particular manner in which diodes 124 and 126 are poled. Thus, as described, when the apparent range of the first target object II, a blocking signal is present on control line 63. If the reverse is true, a blocking signal is present on control line 65. These blocking signals are utilized to block the appropriate video signal (S1 in the first example, and S2 in the latter example). The blocking signal coupled over control line 63 is utilized to block video signal S1 (from target object I) from passing through its video intensity amplifier 67, and the blocking signal coupled over control line 65 is utilized to block video signals (from target object II) from passing through its video intensity amplifier 69.

A blocking signal cuts off the video intensity amplifier it is coupled to regardless of the polarity of the blocking signal. For example, since there may either be a positive or negative blocking signal or signals on any one of the blocking lines 63, 65, 125, 127 and 129 at a particular time, depending on the particular target objects being compared, a pair of diodes 131 and 132 (see FIG. 9 which shows the input circuit to video intensity amplifier 67), properly poled, to allow a positive blocking signal to be coupled to the cathode section 135, or a negative blocking signal to be coupled to the grid 137 are used to connect the blocking signal to the video intensity amplifier. Thus, it can be seen that whatever the polarity of the blocking signal, it will be cut off its associated video intensity amplifier and thereby block any video signals present at the input of said video intensity amplifier from being transmitted.

Another embodiment of the inventive concept is shown in FIG. 10. Here three cameras with amplifiers are employed, two for target ships I and II (viz, 11 and 12) and one (75) for the background. The outputs from cameras 11 and 12 are connected to a pair of trigger, or wave shaping, circuits 300 and 302, respectively, each of which provides a positive pulse output (+12 volts) whenever a video signal is present at its input and a zero output at all other times.

When an output pulse is present at the collector of transistor 304, for example, it is transmitted through diode 306 of an "OR" circuit 308 to transistor 310 of a blanking amplifier 312 and drives transistor 310 full on. The collector of transistor 310 is connected to the output of line amplifier 313 and therefore blanks its output. Thus, for the time interval of any line scan during which a video signal from ship I is present, the background is blanked out.

The same blanking process occurs for the signal from the camera 12 which views ship II, trigger circuit 302 now being utilized.

For the particular range-comparison circuit employed here, the range-control signal from ship I is a variable positive DC voltage and that from ship II is a variable negative DC voltage. If ship I is passing in front of ship II, the magnitude of the range-control voltage ($V_1$) from camera 11 is greater than the magnitude of the range-control voltage ($V_2$) from camera 12. The base of transistor 316 is therefore positive, its collector is at a low voltage and the base of transistor 318 is negative. Since this transistor 318 is cut off, its collector is at +12 volts. When signals appear simultaneously at the outputs of the two trigger circuits 300 and 302, there is no current flow through the diodes of the "AND" circuit 320. This places a positive voltage on the base of transistor 322 of the blanking amplifier 324, driving this transistor full on. Since the collector of transistor 322 is connected to the output line 326 of the line amplifier 318 for the camera 12, target ship II is blanked out. Note that for this case, the base of transistor 328 in blanking amplifier 330 is negative because it is connected through diode 332 of "AND" circuit 334 to the collector of transistor 316. (As stated previously, this collector is at a low voltage, approximately ground.) Transistor 328 is therefore cut off and does not affect the transmission of the target I signal through line amplifier 317.

If ship II is passing in front of ship I, the magnitude of $V_2$ is greater than the magnitude of $V_1$ and the base of transistor 316 is negative, so that it is cut off and transistor 318 is full on. Now transistor 322 is cut off so that the signal from ship II is transmitted. Since the collector of transitor 316 is at +12 volts, when pulses from the trigger circuits 300 and 302 also appear at the diodes of "AND" circuit 334, none of the diodes conduct and the base of transistor 328 is positive. Since transistor 328 is full on, the output of line amplifier 315 is shorted and target I is blanked out.

The outputs of the line amplifiers 313, 315 and 317 are fed into signal-combining circuit 97, which in this instance, is a simple "OR" circuit and the output of the signal-combining circuit is fed through another line amplifier 319 to the display device.

The preferred embodiment of the invention, as illustrated in FIG. 12, is very similar to the embodiment shown in FIG. 10. The camera means are being used here to view three ship targets rather than two targets and a background scene as in FIGURE 10. The camera means, and the wave shaping means, the blocking control circuit, the amplifiers, the signal combining means and the display device are all the same.

The range comparison circuit 37 has three component units instead of one. In the circuit of FIG. 10, a range comparison is required only for the two targets. Since the background is always at a greater range than any target, no range comparison is necessary between the background and each target. However, in FIG. 12, where three targets are being viewed, range comparisons are required between each pair. Thus, three sets of range potentiometers 333 are shown in the range-control means 23 (note that, for purposes of clarity, other components of the range-control means 23, such as the members which permit control of the amplitudes of the camera sweep voltages, are not shown here). The dashed lines indicate sections of the potentiometers for which the movable contacts are mechanically coupled together. The legend "R–1," for example, indicates that this potentiometer provides a voltage indicative of the range of the target viewed by camera means #1.

The coincidence means 60 consists of three ordinary "AND" gates utilizing two diodes each. The topmost gate combines video signals from camera means #1 and #2, providing an output signal marked "1.2" which signifies an output signal during the time of coincidence of the input signals from camera means #1 and #2.

The logic circuit 370 in this case includes of three "OR" gates 334, 336 and 338. The topmost "OR" gate 334, for example, combines outputs A and $\overline{B}$ from the range comparison means 37 to give an output $A+\overline{B}$. Signal A indicates that target 1 is in front of target 2; signal $\overline{B}$ that target 3 is in front of target 2; and signal $(A+\overline{B})$ indicates that target 1 is in front of 2, or 3 is in front of 2, or both 1 and 3 are in front of 2. The outputs of "OR" gates 336 and 338 are $(\overline{A}+\overline{C})$ and $(B+C)$, respectively, which signals indicate that target 1 is be-behind target 2 or target 3 or both, and that target 2 is behind target 1 or target 3 or both.

Three other "OR" gates 340, 342 and 344 are connected to receive as inputs the outputs of the "AND" gates of the coincidence means 60, and to combine these outputs in pairs. The output of the topmost "OR" gate 340 is (1·2+1·3) which is a signal which exists when the video signals of targets 1 and 2, or 1 and 3, or 1 and 2 and 3 are coincident. The output of the middle gate 342 is (1·2+2·3) which indicates the period of coincidence of target 2 with either targets 1 or 3, or both. The output of the bottom gate 344 is (1·3+2·3) which indicates the period of coincidence of target 3 with either targets 1 or 2, or both.

The outputs of the range-comparison-signal "OR" gates 334, 336 and 338 and the time-coincidence "OR" gates 340, 342 and 344 are then suitably combined in pairs in three "AND" gate circuits 346, 348 and 350 to give three output signals, $p=(\overline{A}+\overline{C})\cdot(1\cdot2+1\cdot3)$, $$q=(A+\overline{B})\cdot(1\cdot2+2\cdot3)$$

and $r=B+C)\cdot(1\cdot3+2\cdot3)$. Signal $p$ exists when target 1 is behind either or both of the other targets and the video signals of target 1 are coincident with either or both of the video signals of the others; it is applied to a blanking amplifier 312 causing the diode 352 and transistor 354 to conduct, thereby shunting the output of video amplifier 313 (target 1 video signals) to ground.

Similarly, signal $q$, which is applied to video amplifier 315, exists when target 2 is behind either or both of the others and the video signals from target 2 are coincident with those from either or both of the others; and signal $r$, which is applied to video amplifier 317, exists when target 3 is behind either or both of the others and the video signals from target 3 are coincident with those from either or both of the others.

The logic of the system, when extended to five targets, is considered in more detail below. It is obvious that additional range-control potentiometers and range-comparison circuits are necessary.

Let signal A be present when target 1 is in front of 2.
Let signal $\overline{A}$ be present when target 2 is in front of 1.
Let signal B be present when target 1 is in front of 3.
Let signal $\overline{B}$ be present when target 3 is in front of 1.
Let signal C be present when target 1 is in front of 4.
Let signal $\overline{C}$ be present when target 4 is in front of 1.
Let signal D be present when target 1 is in front of 5.
Let signal $\overline{D}$ be present when target 5 is in front of 1.
Let signal E be present when target 2 is in front of 3.
Let signal $\overline{E}$ be present when target 3 is in front of 2.
Let signal F be present when target 2 is in front of 4.
Let signal $\overline{F}$ be present when target 4 is in front of 2.
Let signal G be present when target 2 is in front of 5.
Let signal $\overline{G}$ be present when target 5 is in front of 2.
Let signal H be present when target 3 is in front of 4.
Let signal $\overline{H}$ be present when target 4 is in front of 3.
Let signal I be present when target 3 is in front of 5.
Let signal $\overline{I}$ be present when target 5 is in front of 3.
Let signal J be present when target 4 is in front of 5.
Let signal $\overline{J}$ be present when target 5 is in front of 4.

Let $p$, $q$, $r$, $s$, and $t$ be the input signals for the blanking amplifiers connected to the video amplifiers which transmit the video signals from targets 1, 2, 3, 4 and 5, respectively. Then the logic equations are:

$$p=(\overline{A}+\overline{B}+\overline{C}+\overline{D})\cdot(1\cdot2+1\cdot3+1\cdot4+1\cdot5)$$
$$q=(A+\overline{E}+\overline{F}+\overline{G})\cdot(1\cdot2+2\cdot3+2\cdot4+2\cdot5)$$
$$r=(B+E+\overline{H}+\overline{I})\cdot(1\cdot3+2\cdot3+3\cdot4+3\cdot5)$$
$$s=(C+F+H+\overline{J})\cdot(1\cdot4+2\cdot4+3\cdot4+4\cdot5)$$
$$t=(D+G+I+J)\cdot(1\cdot5+2\cdot5+3\cdot5+4\cdot5)$$

The operation of the circuits will now be discussed in somewhat greater detail. The video signal from a camera means, e.g. 11, is fed directly to a video amplifier 313 and a wave shaping circuit 300. Transistor Q1 is operated class A to reduce any delay that would be caused in overcoming the base-emitter diode threshold. When no video is applied to the base of Q1, its collector is at a positive potential. The resistive network between the positive and negative 12 v. supplies in the circuit applies a positive potential to the base of Q1, causing it to saturate, which clamps its collector to ground potential. During the time when a video signal is applied, the circuit switches states and a positive voltage output is provided at the collector of Q2. This positive output voltage is indicated by the numeral 1 at the collector terminal.

The output of trigger circuit 300 is fed to diode D1 and the output of the middle trigger circuit is fed to diode D2, the two diodes forming an "AND" gate. When transistors Q2 and Q4 are saturated (no video), the output point 352 of the diode "AND" circuit is at ground, but when video signals are present at the inputs of both trigger circuits, transistors Q2 and Q4 do not conduct. This prevents the diodes from conducting and a positive voltage exists at point 352 during the time of coincidence of video signals from targets 1 and 2. This positive signal causes current flow through diode D3 in "OR" gate 340 and a positive signal from the middle "AND" gate (diodes D6 and D7) causes current flow in diode D4 during the coincidence time of video signals from targets 1 and 3. The "OR" gate 340 thus provides a positive output signal (1·2+1·3) during the time of coincidence of signals from target 1 with target 2, or with target 3, or with both targets 2 and 3.

Turning now to the range-comparison circuits, we see that there are six range-control potentiometers associated with a three-target system. These are arranged in three sets of two each. Considering the circuitry feeding into the topmost "OR" gate 334, the resistors of the potentiometers are connected in series between positive and negative voltages of equal value, so that the net voltage at the junction of the resistors connected to the moving arms of the pots will be either a positive or negative voltage depending on the relative settings of the moving arms (the setting of each arm corresponds to the desired, simulated range of the target with which that pot is associated). If the arm of R-1 is set more positive than the arm of R-2 is set negative, the net voltage is positive.

Such a positive voltage permits base current to flow through transistor Q19, clamping its collector to ground and cutting off conduction in transistor Q20. This means that for a net positive voltage output from pots R-1 and R-2 (indicating target 1 is closer to the observer than target 2), the output from the topmost range-comparison circuit is a positive voltage from the collector of Q20, denoted A, which is fed to diode D19. If target 2 is closer than target 1, the net output voltage from the pots is negative and cuts off transistor Q19, permitting a positive signal to appear at its collector. The output of the topmost range-comparison circuit then appears on the $\overline{A}$ line at diode D21.

Similarly, diode D20 is fed from the $\overline{B}$ line coming from the second range-comparison circuit, signal $\overline{B}$ indicating that target 3 is in front of 2. The output of the "OR" gate 334 thus is a positive voltage $(A+\overline{B})$ which exists whenever target 2 is behind (lies at a greater range than) targets 1, or 3, or both.

The range-comparison "OR" gate signals and the time-coincidence "OR" gate signals are now fed in appropriate pairs to three "AND" gates. Considering the topmost "AND" gate 346, for example, signals $(1 \cdot 2 + 1 \cdot 3)$ and $(\overline{A}+\overline{C})$ are fed to the bases of transistors Q7 and Q8, respectively. Each of these transistors is non-conducting unless a positive signal voltage is fed to its base. Therefore when signals are fed to both bases simultaneously, the transistors conduct, placing the collector of Q7 at ground potential for the conduction period. This places a negative potential on the base of transistor Q9, thereby cutting it off and raising its collector to a positive potential. This in turn allows transistor Q10 to conduct, thereby shorting the output of video intensity amplifier 313 to ground through diode D5 and transistor Q10.

FIG. 13 indicates a generalized block diagram of the invention. Each camera means comprises a picture converter tube of the scanning type with associated sweep amplifiers which are fed from appropriate sweep oscillators 17 and 19, one of which includes the basic oscillator timing circuit 15 (shown in FIG. 3). The range-control means have outputs which control the gain of the sweep amplifiers outputs to the video amplifiers if intensity compensation is desired, and outputs to the range-comparison means 37. The target-inhibiting system 40 may be thought to consist of wave-shaping means 50, coincidence means 60, range-comparison means and video-transmission control means 48. The latter may comprise the logic circuit 370 (see FIG. 12) and the blocking control circuit 43. The details of the logic circuit vary with the number of targets and background cameras, as may be seen by comparing the circuit diagram shown in FIGS. 10 and 12.

Basically, the block diagram shows that the video signals are generated by the camera means and fed through video amplifier to a signal-combining means. The integrated signals are then fed to a display means. Video and range-control signals are also fed through another path to the target-inhibiting system which blocks transmission of video signals through the amplifiers when the targets from which the blocked video signals are derived are behind any other targets.

Obviously many modifications and variations of the present invention are possible in the light of the above teachings. It is therefore to be understood that within the scope of the appended claims the invention may be practiced otherwise than as specifically described.

I claim:
1. Apparatus for synthesizing the electrical signals separately derived from a plurality of targets comprising, in combination:
   a plurality of scanning means for deriving electrical signals in accordance with the images presented by said targets,
   the scanning of all said means being time-synchronized and each said means scanning a different one of said targets;
   a plurality of range-control means each connected to a different one of said scanning means for varying the apparent relative ranges of said targets and producing signals proportional to said relative ranges called range-control signals;
   combining means connected to said scanning means for integrating the electrical signals derived from said plurality of scanning means;
   blocking control means connected to said scanning means and said range-control means for preventing the transmission of time-coincident electrical signals from all said scanning means except one; and
   display means connected to said combining means for displaying the output signals of said combining means as a synchronized signal, said display means being of the scanned type and having its scanning time-synchronized with that of said scanning means.

2. Apparatus as set forth in claim 1, in which said scanning means is of the type in which scanning is accomplished in a series of successive line sweeps, each line increasingly spaced from the first line until an entire raster area is covered, each complete raster sweep being called a frame,
   and time-synchronization of all said scanning means being effected with respect to each line and frame.

3. Apparatus as set forth in claim 2, wherein the range-control signal from each range-control means is compared individually with every other range-control signal and a comparison signal is derived from every such comparison which is used to prevent, during the time-coincidence period of the compared signals, transmission of image signals from the scanning means which scans the target having the greater relative range, the end result being the transmission of image signals from only the nearest target during the time-coincidence and image signals from a plurality of targets.

4. Apparatus as set forth in claim 3, wherein:
   said scanning means comprise video camera tubes;
   each said range-control means is associated with a different one of said camera tubes and varies the amplitude of the sweep signals of its associated camera tube;
   said blocking control means includes a blocking circuit; and each camera tube output is paired with the output of every other camera tube, each pair of outputs being made the inputs to a coincidence circuit which produces an output only during the time of coincidence of its input signals, the coincidence-circuit output being used to gate the blocking circuit,
   said blocking circuit also having as an input said comparison signal and operating to produce, in response to said comparison signal, a signal which prevents transmission, during time-coincidence, of that signal of the compared pair which has the greater relative range.

5. Apparatus for synthesizing electrical signals separately derived from a plurality of targets comprising, in combination:
   a plurality of camera means, each for obtaining an image of a different target and for electronically scanning the image to derive video signals corresponding to the target image, the sweep signals of all said camera means being synchronized in time;

a plurality of amplifiers, each being connected to receive as an input the output of a different one of said camera means, for amplifying said target-image video signals;

range-control means connected to said camera means for varying the size of the raster of each said camera means in width and height in accordance with the desired range of the target associated with that camera means and for producing range-control signals corresponding to value to the desired range of each target;

target-signal inhibiting means, connected to said range-control means, to said camera means and to said amplifiers, for comparing each said range-control signal with every other one and obtaining range-compared signals indicating the relative ranges of said targets, for comparing the video signals with each other with respect to coincidence in time and producing coincidence signals having periods equal to the duration of the video-signal coincidences and for utilizing said range-compared signals and coincidence signals to produce transmission-control signals for permitting transmission only of the video signals corresponding to the target having the least range during the time in which video signals from more than one target are coincident;

signal-combining means connected to said amplifiers for combining the video signals derived from the camera means into a single integrated signal; and display means connected to said signal combining means for displaying said integrated signal in visual form, said display means being of the electronic scanning type having a sweep which is time-synchronized with the sweeps of said camera means.

6. Apparatus as set forth in claim 5, wherein said target-signal inhibiting means comprises:

range comparison means connected to said range control means and providing said range-compared signals as an output;

wave shaping means connected to said camera means for providing signals of fixed amplitude in place of said video signals, the duration of the former being equal to that of the latter;

coincidence means connected to said wave shaping means for comparing the fixed-amplitude signals of each target with those of every other target and providing a coincidence signal during the time any pair of fixed-amplitude signals is coincident; and video-transmission-control means, connected to said range-comparison means, said coincidence means and said amplifiers, for receiving as inputs said range-compared signals and said coincidence signals and producing therefrom a set of signals which indicate for each target its period of coincidence and its relative range with respect to every other target.

7. Apparatus as set forth in claim 6, wherein said video-transmission-control means comprises:

logic circuit means, receiving as inputs the outputs of said range-comparison means and said coincidence means, for operating on these signals to produce a signal for each target whenever that target is simulatedly behind the other targets in range and when any portion of its video signal is coincident with any portion of another target's video signal; and video blocking circuit means, connected to said amplifiers and receiving as inputs the outputs of said logic circuit, for shorting the output of each amplifier when the target whose video signal it amplifies is behind any other target in range and any portion of its video signal is coincident with any portion of another target's video signal.

References Cited
UNITED STATES PATENTS 2,172,936 9/1939 Goldsmith.
3,221,099 11/1965 Breitbord.

ROBERT L. GRIFFIN, Primary Examiner

B. LEIBOWITZ, Assistant Examiner

U.S. Cl. X.R.

178—7.2